United States Patent [19]
Li et al.

[11] Patent Number: 5,465,379
[45] Date of Patent: Nov. 7, 1995

[54] OPTICAL MESH-CONNECTED BUS INTERCONNECT FOR A COMPUTER

[75] Inventors: Yao Li, Monmouth Junction; Satish Rao, Robbinsville, both of N.J.

[73] Assignee: NEC Research Institute, Inc., Princeton, N.J.

[21] Appl. No.: 204,765

[22] Filed: Mar. 1, 1994

Related U.S. Application Data

[63] Continuation-in-part of Ser. No. 854,430, Mar. 19, 1992, abandoned.

[51] Int. Cl.⁶ .................................................. G02B 6/26
[52] U.S. Cl. ........................... 395/800; 364/DIG. 1; 364/249.4; 364/240.6; 359/109; 359/118; 359/127; 385/15; 385/17; 385/31; 385/39; 385/47; 385/53
[58] Field of Search ................ 395/800; 350/96.24; 385/7, 17, 4, 15, 31, 33, 47, 53, 119, 39

[56] References Cited

U.S. PATENT DOCUMENTS

| | | | |
|---|---|---|---|
| 4,779,235 | 10/1988 | Kubota | 365/234 |
| 4,859,012 | 8/1989 | Cohn | 350/96.24 |
| 5,037,173 | 8/1991 | Sampsell et al. | 385/17 |
| 5,115,497 | 5/1992 | Bergman | 395/375 |
| 5,132,835 | 7/1992 | Stoll et al. | 359/339 |
| 5,159,473 | 10/1992 | Feldman | 359/1 |
| 5,165,104 | 11/1992 | Weverka | 385/7 |

OTHER PUBLICATIONS

Arrathoon; "Digital Optical Computing II"; SPIE vol. 1215; pp. 132–142.
Guha et al; "Optical interconnections for massively parallel architectures"; Applies Optics; vol. 29, No. 8 Mar. 10, 1990; pp. 1077–1093.
McAulay; "An extendable optically interconnected parallel computer" IEEE 1986, pp. 441–447.
Frietman et al; "Parallel optical interconnects: implementation of optoelectronics in multiprocessor architectures" Applied Optics, vol. 29, No. 8, Mar. 10, 1990, pp. 1161–1177.

*Primary Examiner*—Krisna Lim
*Attorney, Agent, or Firm*—Arthur J. Torsiglieri

[57] ABSTRACT

Different components of a computer are interconnected by a free space optical mesh-connected bus network using wavelength division multiple access. The network includes optical elements, such as cylindrical lens or mirrors, to transform a spot of light emitted by a source into a stripe of light that illuminates a row or column of detectors, of which one is tuned to the wavelength of the light for selection. By a succession of such networks appropriately oriented, routing in different perpendicular directions through the network is achieved, whereby any two nodes in a two-dimensional array of nodes can be interconnected.

11 Claims, 6 Drawing Sheets

$$
\begin{array}{ccccccc}
\boxed{\lambda_1} & \boxed{\lambda_2} & \boxed{\lambda_3} & \bullet\ \bullet\ \bullet & \boxed{\lambda_{n-1}} & \boxed{\lambda_n} \\
\boxed{\lambda_n} & \boxed{\lambda_1} & \boxed{\lambda_2} & \bullet\ \bullet\ \bullet & \boxed{\lambda_{n-2}} & \boxed{\lambda_{n-1}} \\
\boxed{\lambda_{n-1}} & \boxed{\lambda_n} & \boxed{\lambda_1} & \bullet\ \bullet\ \bullet & \boxed{\lambda_{n-3}} & \boxed{\lambda_{n-2}} \\
\vdots & \vdots & \vdots & & \vdots & \vdots \\
\boxed{\lambda_3} & \boxed{\lambda_4} & \boxed{\lambda_5} & \bullet\ \bullet\ \bullet & \boxed{\lambda_1} & \boxed{\lambda_2} \\
\boxed{\lambda_2} & \boxed{\lambda_3} & \boxed{\lambda_4} & \bullet\ \bullet\ \bullet & \boxed{\lambda_n} & \boxed{\lambda_1} \\
\end{array}
$$

Fig. 2

OPTICAL MESH-CONNECTED BUS INTERCONNECT FOR A COMPUTER

This application is a continuation-in-part of application Ser. No. 07/854,430 filed Mar. 19, 1992, now abandoned.

FIELD OF INVENTION

This invention relates to a free space mesh-connected bus network that uses optical energy in free space to make the interconnections. Such a network can be used especially to provide free-space optical interconnect links in a computer that includes a large number of processing elements for use in parallel processing.

BACKGROUND OF THE INVENTION

There has been considerable study of various network interconnection topologies. In particular, a paper entitled "Communication Structures for Large Networks of Microcomputers" by L. D. Wittie, IEEE Transactions on Computers, Vol. C-30, #4, April 1981 pps. 264–273, describes a variety of electrical interconnection networks that are deemed especially useful for interconnecting a large number of processing elements.

Currently, there is increasing interest in optical interconnection networks because of the fast transfers, large bandwidth and non-interfering free-space propagation that such networks promise. A reconfigurable optical interconnect, such as a completely-connected cross-bar, was expected to be of special interest because its non-blocking communication structure is capable of providing a large degree of routing flexibility with a short reconfiguration time. It appears, however, that the routing flexibility of a cross-bar with N processing elements is offset by its serious energy drawback, e.g. a power distribution loss (PDL) proportional to N. Based on this fundamental limit, it is expected that a cross-bar can only be efficiently implemented for a moderate value of N, say less than 1000. A second major difficulty for an optical cross-bar has been the lack of efficient optical components for a two-dimensional array implementation, so that the tendency has been to put N processing elements along a linear array.

The Mesh-Connected-Bus (MCB) network topology used in the invention may be viewed as a two-dimensional example of Wittie's D-dimensional hypercube bus family networks, and Wittie has pointed out that such networks have a connectivity of $\sqrt{N}$ and are amenable to non-blocking switching in three routing steps. A subsequent paper entitled "Wavelength Division Multiple Access Channel Hypercube Processor Interconnection" IEEE Transitions on Computers VOL C-41, pps. 1223–1241, (1992) proposes a fiber optical architecture to implement such a network but such an architecture becomes very complex when a large number of processing elements are to be interconnected.

SUMMARY OF THE INVENTION

An object of the present invention is an optical interconnect technique that reduces the shortcomings of previously proposed techniques. In particular, the invention provides a free-space optical interconnect network that is based on a mesh-connected bus (MCB) architecture which possesses a PDL that increases as $\sqrt{N}$ where N is the number of processing elements to be interconnected. This network is well adapted for interconnecting a high density array of processing elements.

To this end, an optical MCB network in accordance with a typical embodiment of the invention includes at least one pair of different sets of optical buses, each set being adapted to route signals in a linear direction, with successive sets being adapted to route signals in a direction perpendicular to the direction of routing provided by the preceding set. As the term is used herein, each optical bus includes a plurality of nodes to each of which is coupled a separate processing module. A processing module includes a processing element, a light source to which is supplied information to be transmitted from the processing element, and a light detector to which is supplied light pulses corresponding to the information to be received by the processing element. The light sources and light detectors in each set are arranged to form a two-dimensional array of rows and columns of light sources and light detectors, each separate array forming one routing stage. Each light source in a row or column of one optical bus is potentially able to access all of the detectors in the row or column to which a given source belongs. To reduce the PDL, optical elements are included that transform a spot of light emitted by a single light source in a row or column into a stripe of light that irradiates a whole row or column of light detectors. To discriminate among the information potentially receivable, multiplexing schemes using time, wavelength and code may be used. In the preferred mode, wavelength division multiplexing is used and the disclosure will focus on such a multiplexing process.

In the preferred embodiment, a central control, to which has been supplied information as to the two end points of the desired transmission, sets the relationships of the wavelengths of the light sources and the wavelength tunings of the light detectors to establish a desired optical path through the interconnect network comprising at most three separate links, each link corresponding to a free space path between a light source and a detector in an optical bus.

A feature of each interconnect link is its use of optical components capable of imaging and broadcasting in two perpendicular or orthogonal directions so that a spot of light from a single source can be transformed into a broad stripe of light to irradiate each detector of a linear arrangement of detectors of an optical bus. Suitable optical components of this kind includes a cylindrical lens, a curved cylindrical mirror and a hologram.

The invention will be better understood from the following more detailed description taken into conjunction with the accompanying drawing.

BRIEF DESCRIPTION OF THE DRAWINGS

FIG. 2 is a chart illustrative of a suitable assignment of wavelengths for an interconnection arrangement in accordance with the invention.

DETAILED DESCRIPTION OF THE INVENTION

Figure 1:
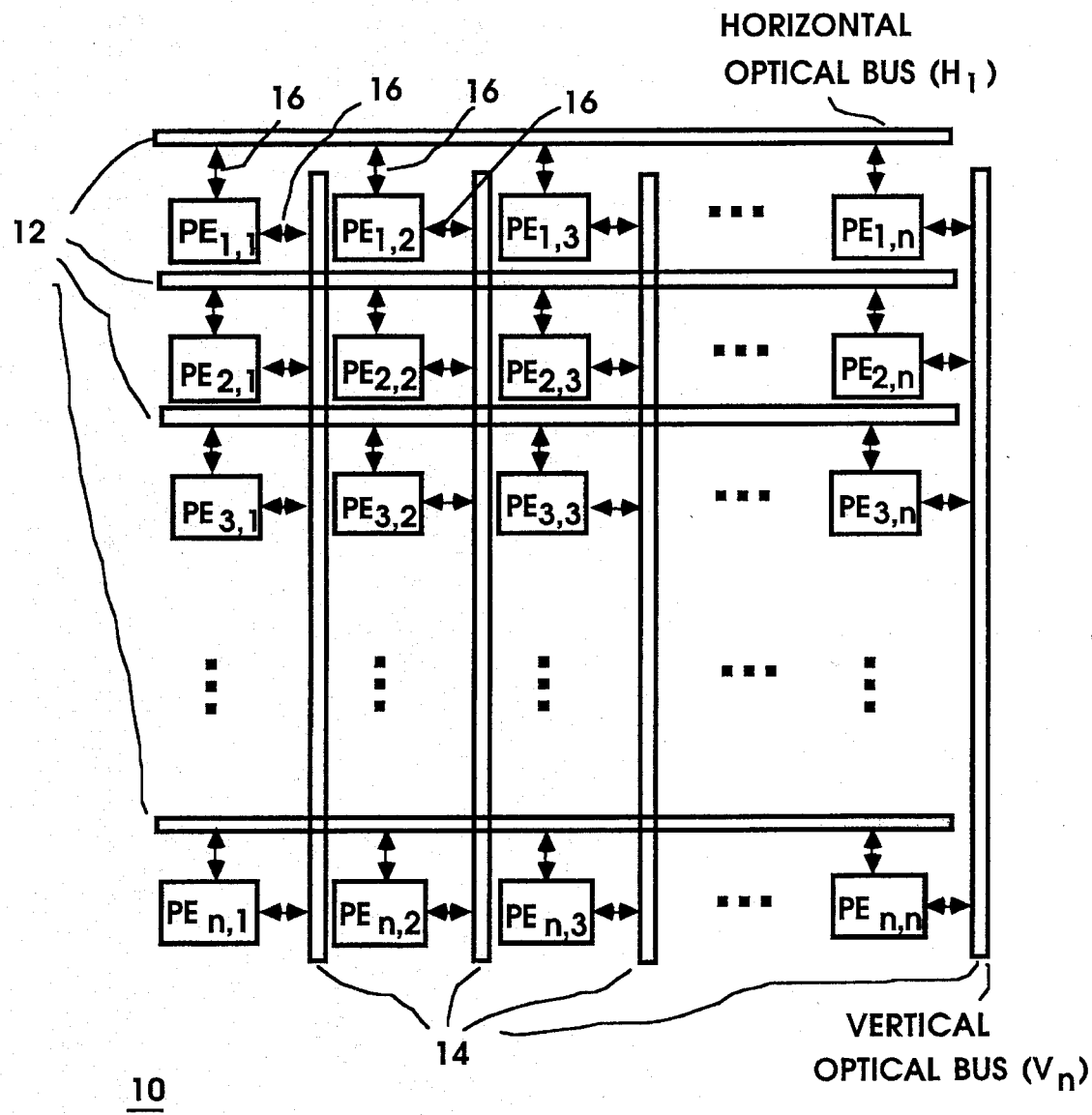
FIG. 1 in a topology connection diagram illustrating the basic architecture of a mesh-connected bus network, capable of completely interconnecting N processing modules appropriately arranged in a two-dimensional array.
Figure 6:
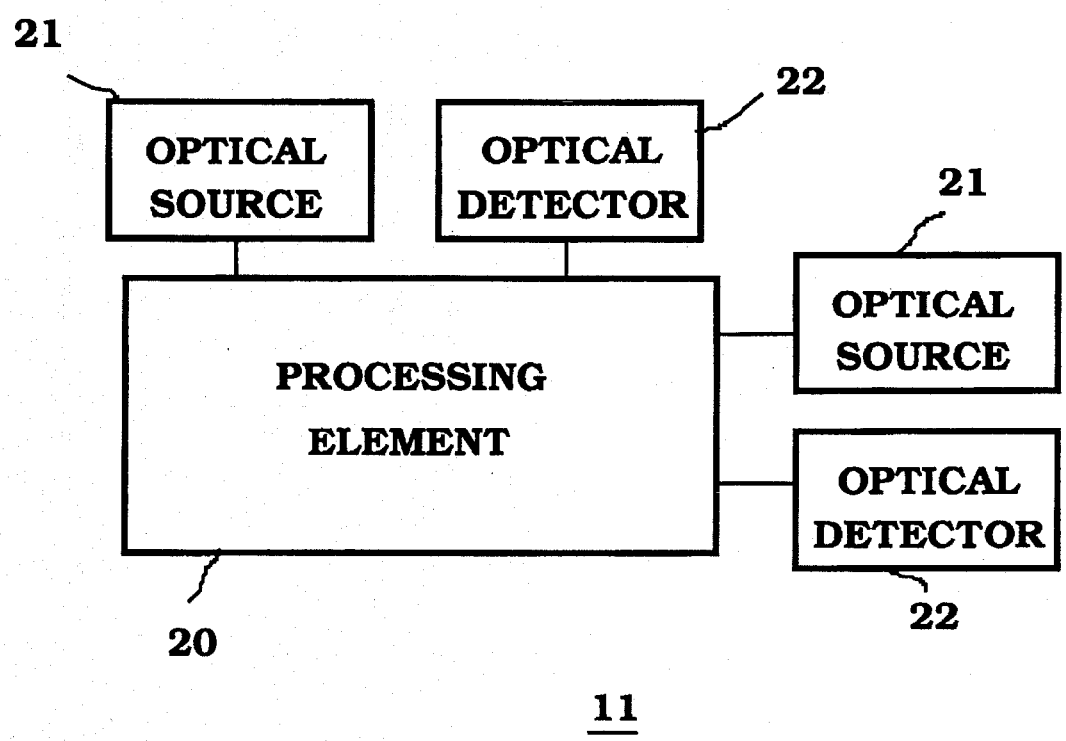
FIG. 6 shows schematically a processing module comprising a processing element and two separate transmitter-receiver pairs.

With reference now, more particularly to the drawing, FIG. 1 illustrates schematically the basic architecture of a MCB network (10) suitable for fully interconnecting N processing subassemblies (11). As seen in FIG. 6, each processing module first includes a processing element 20, which is a computer component to be interconnected, and may include microprocessors, memory elements or various peripheral devices. Associated with each such processing element 20 are two transmitter-receiver pairs. The transmitter of each pair is a light source 21 whose primary function is to generate binary optical pulses for transmission of information from its processing element to a receiver. The receiver of each pair is a light detector 22 whose primary function is to detect binary optical pulses that had been generated by a light source that provide information destined for its processing element. Additionally, the light sources and light detectors also serve to form the endpoints of the separate links in the transmission when multiple routing stages or links are needed to transmit information between a pair of processing elements.

The network 10 comprises a pair of routing stages, each stage comprising a parallel set of optical buses. One stage may be viewed as made up of a set of n horizontal optical buses 12, designated $H_1$ to $H_n$, and the other stage as a set of n vertical optical buses 14, designated $V_1$ to $V_n$, where n is equal to $\sqrt{N}$. Each optical bus includes n nodes 16 with a separate transmitter-receiver pair of the processing modules associated with each node. Consequently, each of the two stages consists of a separate two-dimensional array of transmitter-receiver pairs arranged in n rows and n columns. As seen in FIG. 1, each processing module 11 is coupled to a node in an horizontal bus 12 of the first stage and a node in a vertical bus 14, of the second stage. The two subscripts associated with each processing module symbol P indicate the particular one of the horizontal and vertical buses, respectively, to which it is coupled. As will be explained below, each single source in any horizontal bus is allowed to illuminate every detector in its associated bus but typically only one detector in the bus is able effectively to detect the light. For example, in the preferred wavelength division multiplexing operating mode, the light sources at a particular node in both the horizontal and vertical buses of the module emit a fixed one of a number of different wavelengths and only one detector at a given time in that same bus is tuned to accept such wavelength. By tuning a particular detector to the wavelength of the emitting light source, that detector can be chosen to form the end of the first link or step of a preselected routing. By tuning at most the wavelengths of three detectors, the central control can provide a suitable routing through a network.

Alternatively, tunable sources could be used with fixed wavelength detectors, in which case the central control would use the control of the light sources wavelength to determine the routing, in a manner analogous to the control of the light detectors when fixed wavelength light sources are used. When tunable light sources are used, there is also made possible distributed control in place of central control. In distributed control, each module is provided with the flexibility to choose the light source wavelength for the next link in the routing and this choice may be on a random basis.

In one example, this first routing to a detector in the same bus effectively provides a first horizontal link in the routing. If the processing element with which this detector is associated is not the processing element for which the information is intended, the central control serves to block passage of the information to this processing element but instead sees that the information proceeds to its intended destination by a second link, in a direction orthogonal to that of the first link. In this example the detector which has been energized activates the light source in its module such that the light source irradiates all the detectors in the corresponding vertical bus. Then, to control the end point of this link, the appropriate one of such detectors in such vertical bus is tuned to the wavelength of this second light source and a second link in the routing is thus affected. Moreover, if the processing element with which this detector is related is not the intended destination, a third routing link is arranged, in the manner as before, except that in this case the routing is again in the horizontal direction. To this end, the light source in the associated module coupled to its horizontal bus is excited to irradiate all the detectors in the corresponding horizontal bus. Moreover, since three separate routings with each successive routing in a directional orthogonal to the preceding routing, can provide non-blocking routing between any two elements of a two-dimensional array, the detector tuned to accept the emitted light should be the one associated with the processing element intended as the final destination of the signal information, if the central control has operated properly.

To maximize efficiency it is generally desirable, although not necessary, to use the same n wavelengths for the n sources in each horizontal bus and in each vertical bus. However, to avoid a possible assignment contention, a cyclic permutation of the wavelengths for the two-dimensional array of sources of each stage, as shown in FIG. 2, is desirable. As seen, after assigning the sources in the top row in a progressive order from wavelengths $\lambda_1$ to $\lambda_n$, each succeeding row involves shifting the assignment one unit to the right from the previous row, such that no row or column in the array has two identical wavelengths. For simplification, in FIG. 2 there are shown only the numerical subscripts of the different wavelengths of the various sources in a two-dimensional array. Since in each processing module both the source coupled to the horizontal bus and the source coupled to the vertical bus are advantageously of the same wavelength, a single source which provides two light beams could alternatively have been used, and as used herein, such an arrangement shall be considered as involving two light sources.

Using a network as described, any single interconnection can be performed in at most two routing steps, if only a single interconnection is permitted at a given time. However, if plural interconnections are permitted at one time, a complete set of nonblocking interconnections can be performed in at most three routing steps.

It should be first helpful to provide an example of how a two link routing could be used to interconnect the processing element of module $P_{1,1}$ to the processing element of module $P_{n3}$, as shown in FIG. 1. In particular, assuming the wavelength assignments shown in FIG. 2, one possible routing could involve setting in the interval one the horizontal bus detector in module $P_{13}$ to wavelength $\lambda_1$, and in interval two the detector vertical bus of module $P_{n3}$ to wavelength $\lambda_3$. If however, it were not feasible to use a two link route because of contention with other transmission, a three link path can be effected by tuning in the first interval the detector in the horizontal bus of module $P_{1n}$ to wavelength $\lambda_1$, in the second interval the detector in the vertical bus associated with module $P_{nn}$ is tuned to wavelength $\lambda_n$, and in the third interval the detector in the horizontal bus of module $P_{n3}$ would be tuned to $\lambda_1$.

In the interest of compactness, the array of horizontal buses and the array of vertical buses should be relatively close together. However, it will be important to provide optical paths therebetween which include free space where there may be positioned the optical element to provide the desired transformation of light spots emitted by the light sources into light stripes suitable for irradiating a whole row or column of detectors. It will be useful at this point to explain the role of cylindrical elements for converting a spot of light, typically essentially either circular or elliptical, into a strip of light.

Figure 3A:
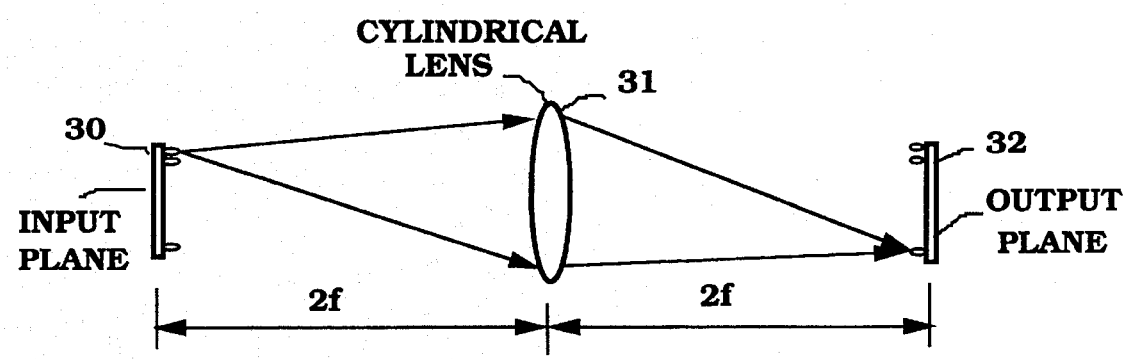
FIGS. 3A and 3B are side and top views for illustrating the properties of a cylindrical lens when used in accordance with the invention.
Figure 3B:
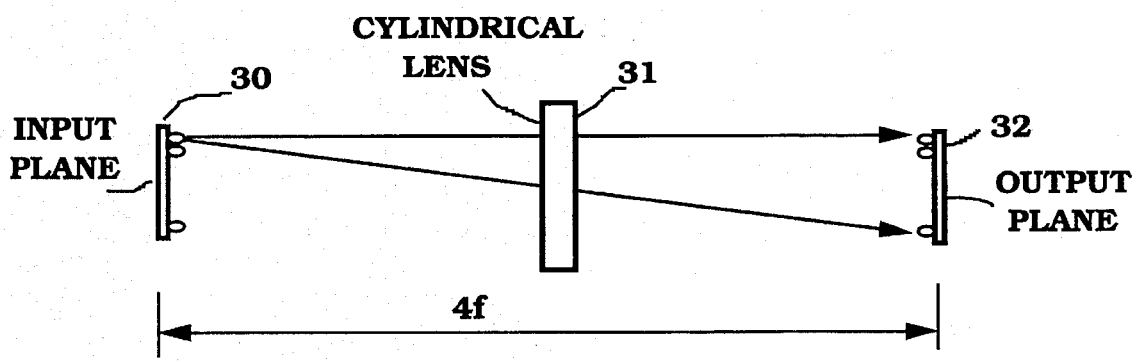

To this end FIG. 3A and FIG. 3B are a side view and a top view, respectively, of an arrangement for transforming a spot light, such as would be emitted by a single diode laser light source, into a stripe of light suitable for irradiating an entire row or column of detectors. It comprises a first plane 30, a cylindrical lens 31, and a second plane 32. The cylindrical lens is spaced a distance $2f$ from each of the planes, where f is the focal length of the lens, so that a spot of light originating on first plane 30 remains imaged to a spot in the side view but is broadcast in the top view so that it effectively becomes a narrow stripe on the second plane 32.

The advantage of having input plane 30 corresponding to the light sources and output plane 32 corresponding to the light detectors be substantially coplanar makes it unattractive to use the simple arrangement depicted in FIGS. 3A and 3B in embodiments of the invention. Rather it is preferable to use an optical system in which the input and output planes substantially coincide, as shown in FIGS. 4 and 5. In these arrangements the arrays of light sources and light detectors are essentially coplanar but the routing uses optical paths that include optical components that redirect light emitted initially for travel away from the common plane back towards the common plane.

Figure 4A:
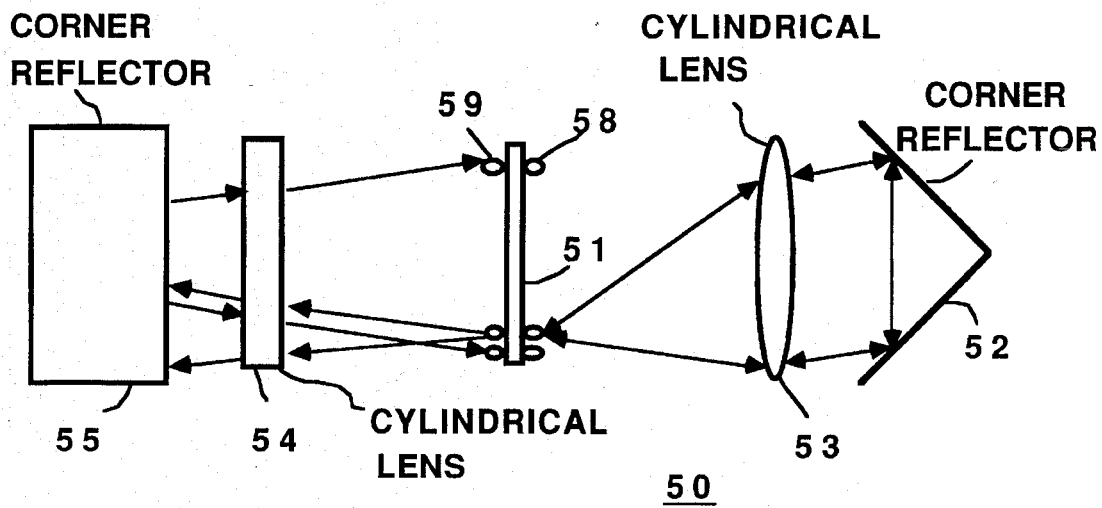
FIGS. 4A and 4B show side and top views, respectively, of the basic components of an embodiment of the invention that uses a pair of cylindrical lenses and a pair of roof reflectors.
Figure 4B:
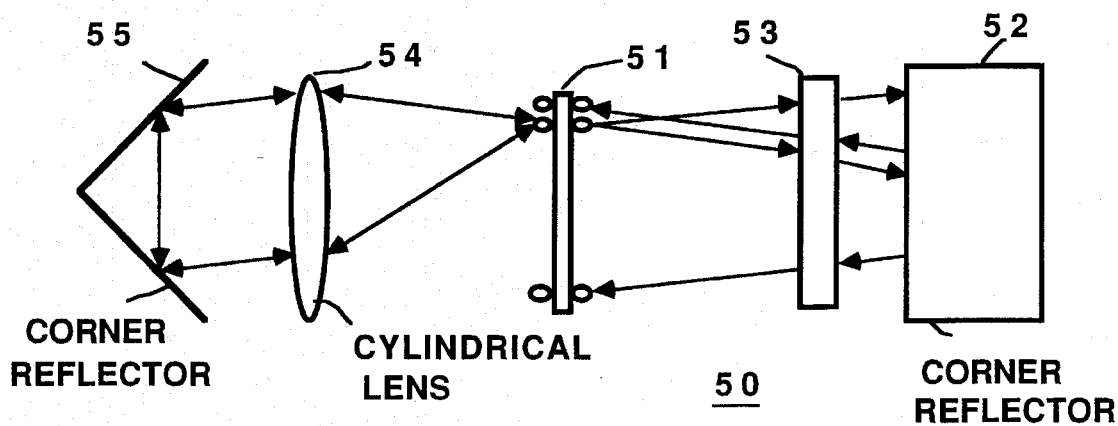

FIGS. 4A and 4B shows side and top views, respectively, in the manner previously of FIGS. 3A and 3B, of a folded version 50 that makes possible two routing steps needed in a more compact structure. In this case, a support 51 is centered between a first combination of a first rooftop reflector 52 with its apex angle of 90° degree plus or minus no more than 0.1 degree and a first cylindrical lens 53, and a second combination of a second cylindrical lens 54 and a second similar right angle rooftop reflector 55. As seen, the two cylindrical lens 53 and 54 and the two rooftop reflectors 52, 55 have their axes rotated ninety degrees relative to one another.

In this assembly, one surface of the support 51 serves both as an input plane and an output plane for a first routing step, while the opposite surface serves these roles for a second routing step. To this end, each surface of the support 51 supports a different set of optical buses of the kind previously described for serving as two separate routing stages, so that the right half of the assembly may be used for the first routing stage and the left half for the second routing stage in the direction perpendicular to the first routing. The processing element to be interconnected would also advantageously be best positioned on this same support suitably distributed between the two opposed surfaces. Information to be routed from a sending processor is first used to excite a light source in the right half which in turn is used to excite the appropriate detector in the right half corresponding to a desired first routing, in a manner analogous to that previously described. This detector is used to excite the corresponding source of the same subassembly in the left half and this is used to excite a detector in the left half in the described fashion corresponding to the desired second routing step, in the manner analogous to that previously described. Because of the change in orientation of the two cylindrical lenses and the two rooftop reflectors, the routing in the two halves of the assembly will have the desired ninety degree difference in direction.

In this arrangement, by action of the cylindrical lenses, a light spot of a particular wavelength on the first surface of the common support will be transformed by the cylindrical lens into a stripe and this stripe will be reflected back in the direction from which it came by the rooftop reflector to irradiate a row of detectors on this same plane of which the one appropriately tuned to the source wavelength will be energized. This detector is used in turn in the next routing interval to excite the source of its subassembly on the second surface of the support 51, and whose light spot will be transformed by the affected cylindrical lens into a stripe that will after reflection by the affected rooftop reflector be a stripe of light that irradiates a column of the detectors on the second surface of which one can be selected as before. In this way, routing in the two orthogonal directions can be realized. If a third routing is desired, the right hand half can be used again to provide the third routing link.

Since routing involving wavelength division multiple access as described uses a large bandwidth and because a cylindrical lens tends to be a dispersive component, its focal length being dependent on wavelength, it is important to design the cylindrical lens appropriately. To this end, to reduce this wavelength dependency it may be desirable to form the cylindrical lens as an achromatic doublet formed by cementing together a pair of positive and negative lenses of different materials, as is known in the art.

Calculations made indicate that with available components, 100,000 resolvable channels configured as a 316 by 316 square array should be interconnectable using a total optical wavelength band of 230 nanometers with a channel spacing of 0.75 mn.

The generic concept of using cylindrical optics to perform the free-space interconnects described is not restricted to the use of a cylindrical lens. Of particular promise among alternatives probably the simplest to implement involves the use of curved mirrors.

Figure 5A:
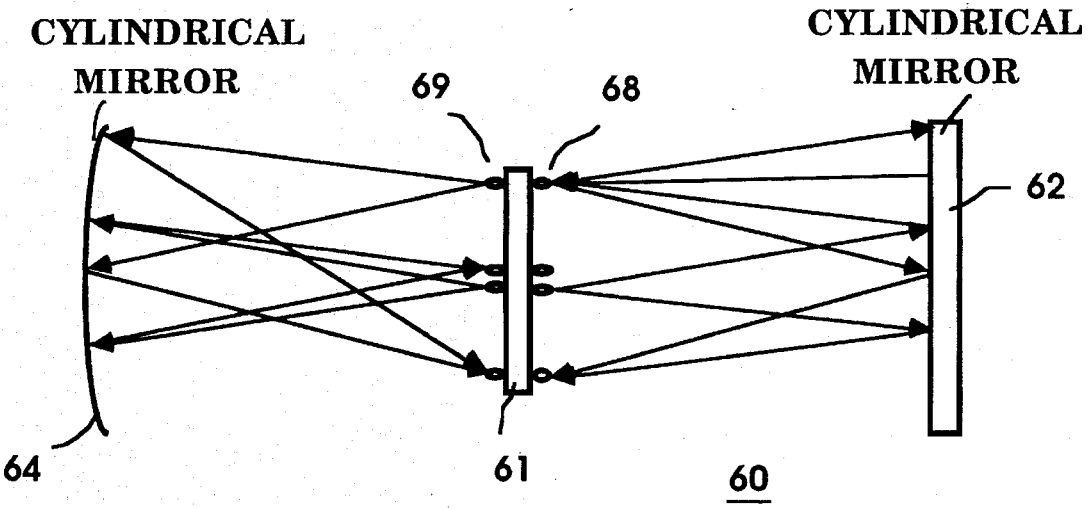
FIGS. 5A and 5B show side and top views of an embodiment that uses a pair of curved mirrors to implement the mesh-connected bus network.
Figure 5B:
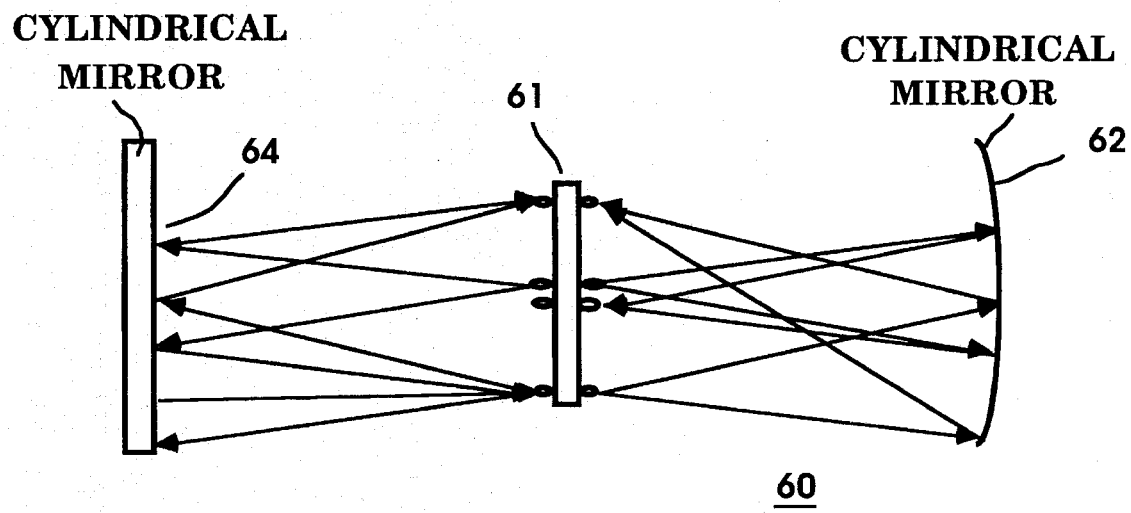

An embodiment 60 of the invention that uses a pair of curved mirrors is shown in side and top views in FIGS. 5A and 5B, respectively. In this embodiment each combination of cylindrical lens and rooftop reflector at opposite ends of the embodiment of FIG. 4 is replaced by a cylindrical mirror 62,64. The two cylindrical mirrors 62,64 are each located a distance R from the two-sided central plane 61, where R is the radius of curvature of each mirror, and the two mirrors are oriented to have their curved dimension orthogonal. Accordingly, as in the previous embodiment, in one half of the network a spot of light on a surface of the input plane is reflected back as a stripe that irradiates a row of detectors and in the other half as a stripe that irradiates a column of detectors, so that routing in two perpendicular directions can be realized as in the earlier embodiment. As before each of the opposite surfaces of the central plane 61 support the two-dimensional interleaved arrays 68, 69 of sources and detectors of the processing subassemblies. Again, selection of an appropriate detector is a row or column is effected by using sources of different wavelengths and detectors separately tuned to such wavelengths in each row and column.

Various devices should be useful as the light sources and detectors. Advantageously, for use where wavelength discrimination is important, the individual sources should emit in discrete narrow bands, and so tuned diode lasers should be especially advantageous. The desired wavelength selectivity of response of the detectors can best be achieved by providing suitable filtering in each detector.

It should also be apparent that a single source may be optically connected to more than one detector in a row or column, if this is desired, by tuning each of such detectors to the wavelength of the source. Such an arrangement can be used when it is desirable to supply information from one processing element simultaneously to more than one other processing element.

Alternatively, by appropriate tuning of wavelengths, more than one processing element can be interconnected to a given processing element at a given time.

It should also be apparent that the individual light sources could be made tunable under control of the central control and each detector operated at a fixed wavelength to control the optical path taken through the network.

It should also be apparent that other optical elements may be used to transform a spot of light into a stripe of light. For example, holograms or gratings can be used to transform a single spot into a line of discrete spots, that for present purposes act in the manner of a stripe of light.

It should also be apparent that other multiplexing schemes can be used. In particular, by dividing time slots among a row or column of nodes a time-sharing bus can be used as a building block to furnish the MCB interconnect purpose. In addition, there may be employed for multiplexing a code-division multiplexing scheme where each of the row or column nodes is assigned a distinct code as an address to distinguish among them.

It should also be apparent that the terms, horizontal, vertical rows and columns as used herein are all relative terms and that they depend on the orientation from which the particular embodiments is viewed.

What is claimed:

1. A mesh-connected bus network comprising:

a plurality of processing modules, each processing module including a processing element, a first and a second light source means, and a first and a second light detecting means, the first and second light source means of said processing modules forming, respectively, first and second two-dimensional arrays of rows and columns of light source means, the first and second light detecting means of the modules forming, respectively, first and second two-dimensional arrays of columns and rows of light detecting means, the first two-dimensional array of light source means being associated with the first two-dimensional array of light detecting means, and the second two-dimensional array of light source means being associated with the first two-dimensional array of light detecting means, the first array of light source means and the first array of light detecting means forming a first routing stage, the second array of light source means and the second array of light detecting means forming a second routing stage orthogonal to said first routing stage, means for optically routing signals in the first stage of said network comprising means for converting a spot of light emitted by any one of said light sources means of any row of said first two-dimensional arrays of light source means into a stripe of light and directing said stripe of light over each of the detecting means in the associated row of the first two-dimensional array of light detecting means, and means for optically routing signals in the second stage of the network comprising means for converting a spot of light emitted by any one of said light source means in any column of said second two-dimensional array of light source means into a stripe of light and directing said stripe of light over each of the detecting means in the associated column of the second two-dimensional array of light detecting means.

2. The network of claim 1 in which the separate pairs of light sources and light detectors are supported on opposite surfaces of a support member with the light sources and light detectors that are members of the same processing module being proximate one another on said support member.

3. The network of claim 1 in which the optical means for converting the spot of light emitted from a light source first and second comprises combinations of a cylindrical lens and a right angle roof-top reflector, said cylindrical lenses and said reflectors in the separate combinations being orthogonally oriented.

4. The network of claim 1 in which the optical means for converting the spot of light from a light source into a stripe comprises separate cylindrical mirrors, the curvature of the separate mirrors being oriented orthogonally.

5. The combination of claim 1 in which the wavelength of the light emitted by the light source means is different for each light source means in a given row and in a given column and the light detecting means are tunable selectively to respond to each of the different wavelengths of the light sources.

6. The network of claim 1 in which each of said optical means is the combination of a cylindrical lens and a right-angle roof reflector, and the orientation of the cylindrical lens and the roof reflector varies by about 90 degrees in the two optical means.

7. The optical interconnect network of claim 1 in which each of said optical means is a curved cylindrical mirror and the orientations of the mirrors in the two optical means are orthogonal.

8. A network in accordance with claim 1 in which the processing elements and the arrays of light source means and light detecting means lie essentially on a common plane, and the optical routing means lie on planes spaced from said common plane to provide free space for the routing.

9. An optical interconnect network for interconnecting a number of processing elements comprising:

a planar support member, a first and a second two-dimensional array in rows and columns of light sources and light detectors on each of the opposed surfaces of the planar support member, the light detectors on one side of the support member being coupled to the light sources on the other side of the support member, the first and second two-dimensional arrays providing orthogonal first and second routing stages, a pair of optical means, separate ones spaced on opposite sides of the support member, one for converting a spot of light emitted from a light source in the first array of light sources into a stripe of light incident on each of the light detectors in a single row of the first array of light detectors, the other for converting a spot of light emitted from a light source in the second array of light sources into a stripe of light incident on each of light detectors in a single column of the second array of light detectors.

10. A network for providing free space optical routing comprising:

a plurality m×n of means for emitting a spot of light arranged in a first two-dimensional array of m rows and n columns, each of said means in a row emitting light of a different wavelength, each of the means in a column emitting light of a different wavelength, a plurality of m×n means for detecting light arranged in a second two-dimensional array of rows and columns corresponding to said first two-dimensional array, each of said second means being tunable to detect a particular one of m wavelengths, and optical means positioned between the light emitting means and the light detecting means for converting the m×n spots of light into n stripes of light, each stripe of light irradiating selectively a different column of light detecting means.

11. A network in accordance with claim 10 in which each row and each column of the array of emitting means have N emitting means and each row and each column of the detecting means have N detecting means.

* * * * *